(12) United States Patent
Schroll et al.

(10) Patent No.: US 6,187,466 B1
(45) Date of Patent: *Feb. 13, 2001

(54) FUEL CELL WITH WATER CAPILLARY EDGE SEAL

(75) Inventors: Craig R. Schroll, Glastonbury; Glenn W. Scheffler, Tolland; Donald L. Maricle, Glastonbury, all of CT (US)

(73) Assignee: International Fuel Cells Corporation

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/121,756

(22) Filed: Jul. 23, 1998

(51) Int. Cl.$^7$ ........................................... H01M 2/00
(52) U.S. Cl. ..................... 429/34; 429/35; 429/36; 429/38; 429/39
(58) Field of Search ..................... 429/34, 35, 36, 429/38, 39

(56) References Cited

U.S. PATENT DOCUMENTS

| | | | |
|---|---|---|---|
| 3,867,206 | 2/1975 | Trocciola et al. | 136/86 D |
| 4,279,970 | 7/1981 | Breault et al. | 429/35 |
| 4,729,932 | 3/1988 | McElroy | 429/34 |
| 4,769,297 | 9/1988 | Reiser et al. | 429/17 |
| 4,826,741 | * 5/1989 | Aldhart et al. | 429/19 |
| 5,176,996 | 1/1993 | Hogan et al. | 435/6 |
| 5,264,299 | 11/1993 | Krasij et al. | 429/30 |
| 5,300,124 | 4/1994 | Breault et al. | 29/623.3 |
| 5,360,679 | 11/1994 | Buswell et al. | 429/19 |
| 5,366,825 | 11/1994 | Breault et al. | 429/34 |
| 5,464,700 | 11/1995 | Steck et al. | 429/30 |
| 5,503,944 | 4/1996 | Meyer et al. | 429/13 |
| 5,523,175 | 6/1996 | Beal et al. | 429/30 |
| 5,700,595 | 12/1997 | Reiser | 429/13 |
| 5,853,909 | * 12/1998 | Reiser | 429/13 |

FOREIGN PATENT DOCUMENTS 389020  10/1989  (AT) ..................... H01M/8/02

* cited by examiner

*Primary Examiner*—Carol Chaney
*Assistant Examiner*—Angela J. Martin
(74) *Attorney, Agent, or Firm*—Barlow, Josephs & Holmes, Ltd.

(57) ABSTRACT

A fuel cell (10), having a proton exchange membrane (48), an anode and a cathode, and cathode and anode water transport plates (12, 16), includes a water capillary edge seal to optimize and greatly improve fuel cell operation without the need for additional seals or impregnation of the water transport plates. The water filled porous bodies of the water transport plates (12, 16) use the capillary forces of the water, which is a product of the electrochemical reaction of the fuel cell (10) and the preferred coolant, to prevent gas intrusion into the water system and over board leakage of the gases as well as the resultant hazardous mixture of gaseous fuel and oxidizing gas.

5 Claims, 3 Drawing Sheets

FUEL CELL WITH WATER CAPILLARY EDGE SEAL

TECHNICAL FIELD

The present invention relates to fuel cells and water transport plates for fuel cells. More specifically, the present invention relates to water management within fuel cells including the containment of reactant gases within the fuel cell.

BACKGROUND ART

Solid polymer electrolyte fuel cell power plants are known in the prior art, and prototypes are even available from commercial sources, such as Ballard Power Systems, Inc. of Vancouver, Canada. These systems are serviceable, but are relatively complex. An example of a Ballard Power Systems polymer membrane power plant is shown in U.S. Pat. No. 5,360,679, granted Nov. 1, 1994.

In addition, known fuel cell constructions commonly include a proton exchange membrane disposed between respective cathode and anode plates. In general, the operation of a proton exchange membrane (PEM) fuel cell includes the supply of gaseous fuel and an oxidizing gas to the anode electrode plate and cathode electrode plate, respectively, and distributed as uniformly as possible over the active surfaces of the respective electrode plates, or, more specifically, the electrode plate surfaces facing the proton exchange membrane, each of which typically includes a catalyst layer therebetween. An electrochemical reaction takes place at and between the anode plate and cathode plate, with attendant formation of a product of the reaction between the fuel and oxygen, release of thermal energy, creation of an electrical potential difference between the electrode plates, and travel of electric charge carriers between the electrode plates, with the thus generated electric power usually constituting the useful output of the fuel cell.

One problem occurring in solid polymer fuel cells relates to the management of water, both coolant and product water, within the cells in the power plant. In a solid polymer membrane fuel cell power plant, product water is formed by an electrochemical reaction on the cathode side of the cells, specifically by the combination of hydrogen ions, electrons and oxygen molecules. The product water must be drawn away from the cathode side of the cells, and makeup water must be provided to the anode side of the cells in amounts which will prevent dryout of the proton exchange membrane, while avoiding flooding, of the cathode side of the electrolyte membrane.

Austrian Patent No. 389,020 describes a hydrogen ion-exchange membrane fuel cell stack which utilizes a fine pore water coolant plate assemblage to provide a passive coolant and water management control. The Austrian system utilizes a water-saturated fine pore plate assemblage between the cathode side of one cell and the anode side of the adjacent cell to both cool the cells and to prevent reactant crossover between adjacent cells. The fine pore plate assemblage is also used to move product water away from the cathode side of the ion-exchange membrane and into the coolant water stream; and to move coolant water toward the anode side of the ion-exchange membrane to prevent anode dryout. The preferred directional movement of the product and coolant water is accomplished by forming the water coolant plate assemblage in two parts, one part having a pore size which will ensure that product water formed on the cathode side will be wicked into the fine pore plate and moved by capillarity toward the water coolant passage network which is inside of the coolant plate assemblage. The coolant plate assemblage also includes a second plate which has a finer pore structure than the first plate, and which is operable to wick water out of the water coolant passages and move that water toward the anode by capillarity. The fine pore and finer pore plates in each assemblage are grooved to form the coolant passage network, and are disposed in face-to-face alignment between adjacent cells. The finer pore plate is thinner than the fine pore plate so as to position the water coolant passages in closer proximity with the anodes than with the cathodes. The aforesaid solution to water management and cell cooling in ion-exchange membrane fuel cell power plants is difficult to achieve due to the quality control requirements of the fine and finer pore plates, and is also expensive because the plate components are not uniformly produced.

In the fuel cell technology, the water transport plate is a porous structure filled with water. During fuel cell operation, the water transport plate supplies water locally to maintain humidification of a proton exchange membrane (PEM), removes product water formed at the cathode, removes by-product heat via a circulating coolant water stream, conducts electricity from cell to cell, provides a gas separator between adjacent cells and provides passages for conducting the reactants through the cell. The water transport plate supplies water to the fuel cell to replenish water which has been lost by evaporation therefrom. This system and operation thereof is described in U.S. Pat. No. 5,303,944 by Meyer, U.S. Pat. No. 5,700,595 by Reiser and U.S. Pat. No. 4,769,297 by Reiser, each incorporated herein by reference. Due to the constraints of the water transport plate formation process, these plates are costly to manufacture and possess limited strength.

For example, water transport plates can be formed in a dry-laid process where graphite powder and powdered phenolic resin are showered into a mold to form a layer. The layer is compacted to form a 0.100 inch thick layer which is heated until the phenolic resin melts and coats the graphite powder. The resin is then cured, thereby bonding the graphite powder in a composite. Although this is a common water transport plate formation process, the forming speed is slow and it is difficult to incorporate relatively long fibers which are desirable for water transport plate structural integrity. Longer fibers tend to become entangled in the dry-laid feeder, thereby forming fiber bundles in the finished composite. This fiber bundling, which corresponds to uneven fiber distribution, creates weak areas within the composite which are susceptible to structural failure. Composite structural integrity is maximized at fiber lengths greater than about 1.0 mm (about 0.040 inches) while the dry-laid process is limited to fiber lengths of about 0.51 mm (about 0.02 inches). Consequently, the tolerances in the specification for the water transport plate are small and the fabrication is difficult, resulting in many rejected parts.

In addition, the environmental and operational parameters of a water transport plate must be carefully balanced to obtain optimum performance of the overall fuel cell. For example, parameters of the water transport plate such as pore size, resistivity, particle size, resin content and yield strength, must be properly selected to obtain bubble pressure characteristics and water permeability which are acceptable for efficient operation of the fuel cell.

A major concern with PEM fuel cells is the water management with the cell. This is of particular concern when employing porous members such as the water transport plates discussed above. This porosity is needed to supply to and substantially uniformly distribute over the respective active surface the respective gaseous medium which is fed through respective channels provided in the anode water transport plate and the cathode water transport plate to the areas of the respective electrode plate that are spaced from the proton exchange membrane. Also, these porous structures are used to remove the reaction water from one of the active surfaces and supply of water to the other active surfaces to avoid drying out of the proton exchange membrane.

When porous water transport plates are employed in a PEM fuel cell, it is necessary to ensure that neither any liquid, such as product or coolant water in a PEM fuel cell, nor any gaseous media such as the fuel or oxidant, be able to flow out of the periphery or edge of the respective porous water transport plate. The escape of water through the periphery or edge of the water transport plates or migration of water proximal to the periphery or edge results in the loss of the respective media within the water transport at hand causing a decrease in fuel cell efficiency. Most importantly, preventing the escape of media through the periphery or edge of the water transport plate is critical to avoid the mixture of gaseous fuel with the oxidizing gas or ambient air which could be catastrophic.

Various attempts have been made in the prior art to avoid the escape of media from the cathode water transport plate and the anode transport plate in a PEM fuel cell. One such attempt is described in U.S. Pat. No. 5,523,175 by Beal, incorporated herein by reference. For example, the edge portions of the plates have been coated with a layer of various materials, such as polytetrafluoroethylene, to prevent the media from escaping. Also, densification of the edge regions of a water transport plate by impregnating the plate with a liquid substance which is later cured to leave behind a residue. This residue assists in preventing escape of fuel cell gaseous media, however, the gaseous media still is able to reach the edge of the plate thus causing undesirable leakage. One deficiency of the U.S. Pat. No. 5,523,175 is that the useable polymers are somewhat hydrophobic. This results in the interface between the polymer filled edge and water filled central region being hydrophobic which results in local leakage of the gaseous media. Liquidous cell electrolyte has been used in the prior art to provide capillary media within a fuel cell. However, such use of electrolyte is inappropriate in PEM type fuel cells where the electrolyte is solid where liquid water is the by-product of the electrochemical reaction of the fuel cell and where water transport plates become filled with water during operation of the fuel cell.

In view of the foregoing, an improved fuel cell is desired which includes improved edge seal characteristics for efficient fuel cell operation. It is also desirable for a PEM fuel cell to include an efficient and reliable structure for containing reactant gases without the need for additional gaskets or the impregnation of the edge portions of the water transport plates of the cell.

DISCLOSURE OF THE INVENTION

The present invention preserves the advantages of prior art proton exchange membrane for fuel cells. In addition, it provides new advantages not found in currently available fuel cells, and overcomes many disadvantages of such currently available fuel cells.

The invention is generally directed to a novel fuel cell with improved edge sealing characteristics. In a PEM fuel cell, the anode water transport plate and cathode water transport plate may be manufactured in various ways but preferably comprises a mixture of graphite powder, reinforcing fibers, cellulosic fibers, and thermosetting resin, which has been formed into a planar sheet. The water transport plate may be formed from a planar sheet which has been cut into a plurality of main sheets which have been laid-up, laminated together, carbonized, and graphitized.

The water transport plate of the fuel cell of the present invention may be laminated which comprises mixing the graphite powder, reinforcing fibers, cellulosic fibers, and thermosetting resin with a liquid to form a slurry which is formed into a planar sheet. The liquid is then removed from the planar sheet and the sheet is cut into a plurality of main sheets. The main sheets are laid-up, laminated, carbonized, and graphitized to form the water transport plate.

It should be understood that the water transport plate of the fuel cell of the present case can be made in a variety of different ways. However, there are certain preferred characteristics and parameters of the finished water transport plate, in accordance with the present invention, to fully optimize the operation and efficiency of a fuel cell. It is preferred that the water transport plate of the present invention have a thru-plane electrical resistivity (@ 100 psi axial load) of 0.02 ohm-cm; a compressive yield strength of 1,050 psi; a median pore size of 1.9 microns; and a open porosity of 40 volume percent (%).

The above water transport plates are employed in a PEM fuel cell to serve as the backing plates and as a transport for the gaseous fuel and oxidizing gas. The present invention provides a configuration for sealing reactant gases within the fuel cell by utilizing water, the by-product of the electrochemical reaction and the coolant within the cell, to establish a liquid water capillary edge seal without the need for additional gaskets or impregnation of edge portions of the water transport plates. The fuel cell of the present design can be operated at near to ambient pressure or can be operated at several atmospheres depending on the system and the application. A stack of PEM fuel cells is exposed to ambient pressure when operated at near ambient pressure and is placed within a containment vessel when the operating pressure is several atmospheres. The containment vessel is generally purged with an inert gas which is maintained at a pressure near to the pressure of the reactant gases. This minimizes the pressure differential across the edge seals and permits the use of so-called wet edge seals. In this manner, the fuel cell can be operated at any pressure from near ambient to several atmospheres. The coolant water is maintained at a pressure which is less than that of the reactants or the purge gas in the containment vessel; but which does not exceed the bubble pressure capability of the edge seal.

It is therefore an object of the present invention to provide a PEM fuel cell assembly which prevents reactant gases from escaping through the edges of water transport plates.

It is also an object of the present invention to provide a PEM fuel cell assembly which prevents the mixture of gaseous fuel and oxidizing gas.

It is further an object of the present invention to provide a PEM fuel cell assembly which provides a water capillary edge seal to contain reactant gases by employing the liquid capillary forces of existing product water and coolant at the edge of the fuel cell to prevent the intrusion of reactant gases into the water system and vice versa.

It is further an object of the present invention to provide a PEM fuel cell assembly which prevents coolant and product water from escaping through the edges of the water transport plates by employing a water pressure which is less than the gas pressure.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

MODES FOR CARRYING OUT THE INVENTION

The present invention is directed toward a fuel cell, with anode and cathode water transport plates and a proton exchange membrane, which includes capillary edge seal characteristics. The fuel cell of the present invention preferably includes a water transport plate comprising graphite powder, cellulosic fibers, and reinforcing fibers all bonded together with a thermosetting resin. This water transport plate may be formed in a papermaking process where the cellulosic fibers provide sufficient wet-strength in the fabrication process such that the paper, in the form of a wet, flat sheet, possesses sufficient tensile strength to traverse the entire papermaking machine without breaking. In contrast, the reinforcing fibers provide structural integrity to the finished water transport plate. The graphite powder provides increased thermal and electrical conductivity in the finished water transport plate as well as principally influencing the median pore diameter thereof, while the thermosetting resin binds the fibers and graphite powder together by forming a continuous phase throughout the water transport plate after lamination and provides an electrical and thermal bridge between the individual graphite particles for enhanced electrical and thermal conductivity after graphitization.

Figure 3:
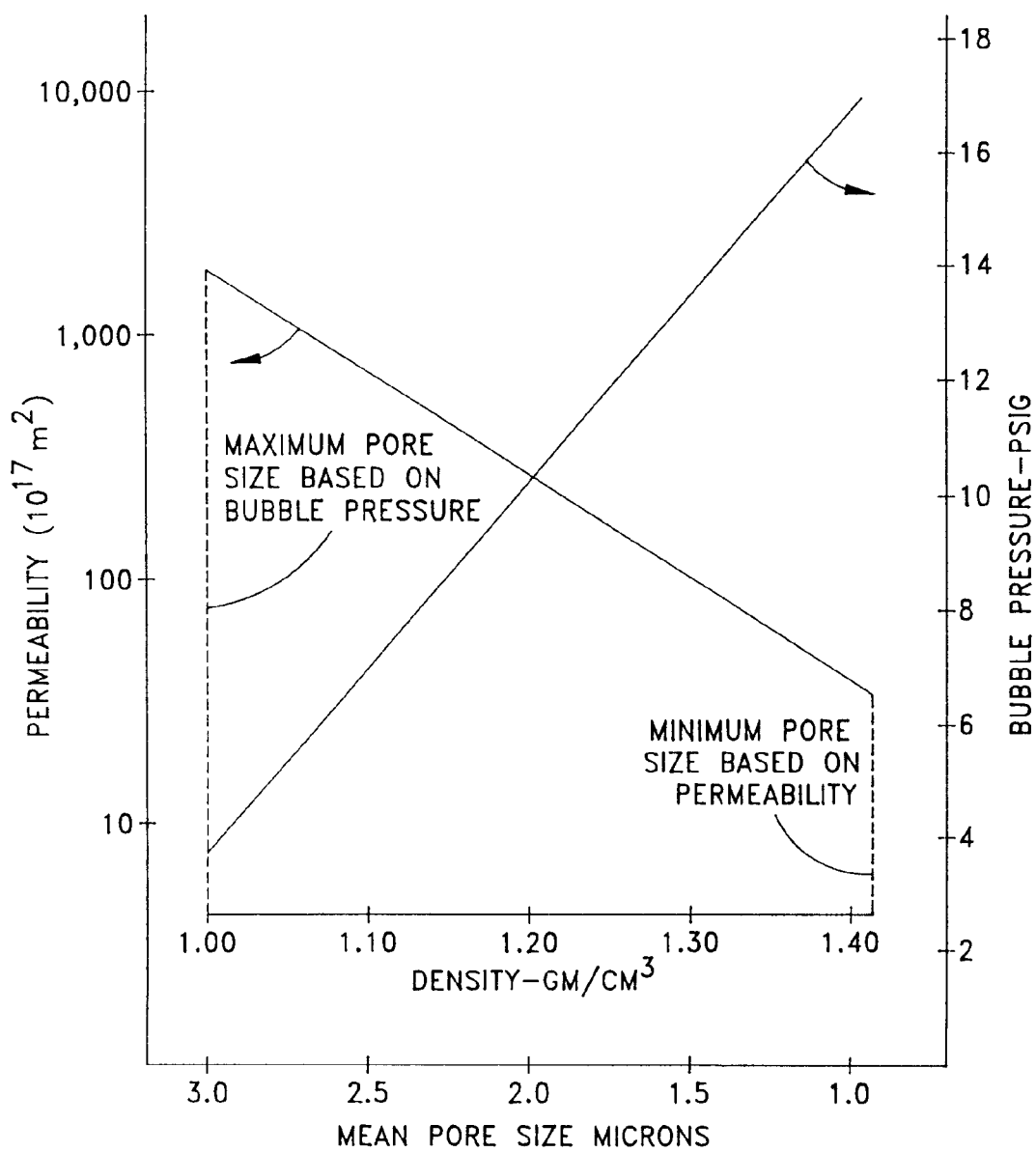
FIG. 3 is a graph illustrating the trade-off between bubble pressure and water permeability in connection with the selection of pore size of a water transport plate within a PEM fuel cell.

The water transport plate of the fuel cell of the present invention can be manufactured in different ways. However, the pore size and porosity of the water transport plate must be carefully tailored to achieve an optimum trade-off between bubble pressure and water permeability. Bubble pressure is the physical characteristic that allows the water transport plate to serve as a gas separator. In accordance with the present invention, capillary forces retain the water within the porous structure until the gas to liquid pressure differential exceeds the bubble pressure. Bubble pressure is increased as the pore size of the water transport plate is decreased. Water permeability is required to remove liquid water from the cathode to the water transport plate as explained in U.S. Pat. No. 5,503,944. FIG. 3 generally illustrates how permeability increases as the mean pore size of the water transport plate increases. In accordance with the present invention, the median pore size is preferred to be 1 to 3 microns and a minimum porosity of 30 percent provides an acceptable combination of bubble pressure and water permeability. Consequently, the median particle size of the graphite powder is typically about 1 micron ($\mu$) to about 150$\mu$, with a median particle size of about 2 to about 75$\mu$ preferred to attain a median pore size of up to 3.0 microns. It is preferred that the water transport plate of the present invention have a maximum thru-plane electrical resistivity (@ 100 psi axial load) of 0.02 ohm-cm; a minimum compressive yield strength of 1,050 psi; a maximum median pore size of 1.9 microns; and a minimum open porosity of 40 volume percent (%). In addition the preferred range of bubble pressure of the water transport plate is 10.5 psig and the preferred range of water permeability of the water transport plate is $200 \times 10^{-17}$ m$^2$.

The concentration of graphite powder in the final water transport plate is typically about 25 weight percent (wt %) to about 55 wt %, with about 35 wt % to about 45 wt % graphite powder preferred. Possible graphite powders include: AIRCO® 90 Graphite Powder produced by Carbide/Graphite Group, Inc., of St. Marys, Pa.; Asbury 4234 Graphite Powder produced by Asbury Graphite Mills, Inc., Asbury, N.J.; and Dixon 200-42 Graphite Powder produced by Dixon Ticonderoga, Lakehurst, N.J.; mixtures thereof; and other conventional graphite powders.

In a preferred manufacturing process for the present invention, the graphite powder is combined with reinforcing fibers which impart structural integrity to the final water transport plate. The ultimate strength of the water transport plate is governed by the amount of bonded reinforcing carbon fiber surface area. If the reinforcing fiber diameter is significantly increased to over about 15$\mu$, less surface area per unit weight of fiber is available for bonding during the thermoset process (discussed below). However, if the reinforcing fiber diameter is significantly below about 5$\mu$, excessive amounts of thermosetting resin are required to bond the water transport plate together. Consequently, these fibers typically have a diameter less than about 15$\mu$, with a fiber diameter of about 5$\mu$ to about 10$\mu$ preferred.

The reinforcing fiber also preferably has a tensile modulus above about 20 MMpsi. When the tensile modulus of the reinforcing fibers falls below about 20 MMpsi, the flexural strength of the composite is no longer governed by the bonded surface area of the reinforcing fiber but by its tensile strength and the structural integrity of the water transport plate is reduced to a flexural strength below about 1000 psi. Consequently, fibers possessing a tensile modulus in excess of abut 20 MMpsi can be employed, with fibers possessing a tensile modulus equal to or in excess of about 30 MMpsi preferred.

In addition to fiber diameter and tensile modulus, the fiber length effects the ability of the reinforcing fibers to impart structural integrity to the water transport plate. Fiber lengths in excess of about 0.04 inches are preferred, with a length of about 0.10 inches to about 0.25 inches especially preferred. For a horizontal wire papermaking machine, for example, fiber lengths exceeding about 0.25 inches are typically undesirable because they diminish the uniformity of the planar sheets due to fiber bundling. Note, longer fibers may not diminish the uniformity of planar sheets formed on other papermaking machines which are more capable of handling long fibers (i.e. inclined wire papermaking machines).

Possible reinforcing fibers include, but are not limited to, carbon fibers such as polyacrylonitrile-based carbon fibers; FORTAFIL® produced by Fortafil Fiber, Inc., of Rockwood, Tenn.; Thornel produced by Amoco Performance Products, Inc., of Ridgefield, Conn.; RK produced by RK Carbon Fibres Limited of Cheshire, England; AS-4 produced by Hercules Advanced Materials and Systems Co., of Magna, Utah; PANEX® produced by Zoltek Corporation of St.

Louis, Mo.; mixtures thereof, and other conventional reinforcing fibers which are compatible with the fuel cell environment.

The concentration of reinforcing fibers in the final water transport plate is typically up to about 20 wt %, with up to about 10 wt % preferred, and about 2.5 wt % to about 7.5 wt % especially preferred. Even though the flexural strength of the resultant water transport plate is significantly increased by the addition of the reinforcing fibers, it is feasible to exclude the reinforcing fibers for the purpose of minimizing material costs. Water transport plates made without reinforcing fibers may limit the cell size (i.e. planform) because scrap rates increase substantially as the planform is increased on parts with low flexural strength.

Since the water transport plate may be produced by forming planar sheets which are laminated together, cellulosic fibers are also mixed with the graphite powder and reinforcing fibers to provide sufficient wet-strength during the papermaking process such that the planar sheets are strong enough to traverse the entire papermaking machine without breaking. Typically, about 10 wt % to about 30 wt % cellulosic fibers are present in the final water transport plate, with about 15 wt % to about 27 wt % preferred. These fibers are preferably small enough to form a substantially uniform sheet while large enough to provide sufficient hydrogen bonding to impart wet strength during papermaking. Consequently, these fibers have fiber diameters of about $30\mu$ to about $45\mu$ and lengths of about 2 mm to about 4 mm. Cellulosic fibers include fibers derived from natural sources such as hardwoods, softwoods, cotton, and hemp or synthetic materials such as rayon, mixtures thereof, and others, with soft wood pulp preferred. Some such fibers include, but are not limited to Prince George, Northern, Semi-bleached Softwood Pulp, available from Canfor of Vancouver, British Columbia; Brunswick, Southern softwood pulp available from Georgia Pacific of Brunswick, Ga.; Columbus, Southern softwood pulp, available from Weyerhaeuser, of Columbus, Miss., mixtures thereof, and other conventional cellulosic fibers.

The mixture of graphite powder, reinforcing fibers, and cellulosic fibers is bonded together with a thermosetting resin which, upon carbonization and graphitization, imparts sufficient structural integrity to the composite to hold the composite together during processing. Typically, thermosetting resins which yield about 40% carbon or greater upon carbonization will impart sufficient structural integrity to the composite post graphitization and provide electrical and thermal continuity between the graphite particles in the water transport plate. Resins with carbon yields below about 40% will likely produce graphitized water transport plates having marginal strength; below about 1000 psi flexural strength. There is no known detrimental effect for incorporating higher carbon yield resins. The thermosetting resins include: phenolic resins, polyamides, petroleum pitches, and furfuryl alcohols, with phenolic resins preferred. For example, PLENCO™ phenolic resin produced by Plastics Engineering Company, Sheboygan, Wis., and OXYCHEM® phenolic resin produced by Oxychem, Durez Division, North Tonawanda, N.Y., mixtures thereof, and others. The concentration of thermosetting resin in the final water transport plate typically ranges from about 25 wt % to about 50 wt %, with about 30 wt % to about 40 wt % preferred. This thermosetting resin can be utilized either in the form of a powder preferably having particle sizes below about $20\mu$, or dispersed in a solvent such as water or an organic solvent such as methanol or ethanol.

Production of the water transport plate comprises forming the solid constituents, the graphite powder, reinforcing fibers, cellulosic fibers, and thermosetting resin, into a slurry using a liquid compatible with the solids. Generally, the liquid is water or a water based liquid. Sufficient liquid to substantially evenly distribute the solid constituents onto the screen of the papermaking machine upon which they are showered, is preferred. Typically, sufficient liquid corresponds to about 90 v/o (volume percent) liquid or greater with about 99 v/o liquid preferred.

The slurry is formed into a planar sheet at approximately 100 lineal feet per minute using a conventional papermaking machine. The slurry is showered substantially evenly onto the horizontal moving screen such that the solid constituents are retained on the screen while the liquid is allowed to pass through. The moving screen travels over a sufficient amount of vacuum sources, or other conventional means, which serve to further dry the retained solid constituents and to promote hydrogen bonding between the cellulosic fibers in the planar sheet. Once the planar sheet is sufficiently dry to support itself, it leaves the screen and travels over several rollers where it is additionally supported by felts running over the rollers. From the rollers the planar sheet travels over a series of heated drums, typically steam or oil heated drums, where residual moisture is volatilized. The dried planar sheet is then spooled onto cardboard tubes for collection. The resultant planar sheet is about 0.508 mm (millimeters; 0.02 inches) to about 1.5 mm (0.06 inches) thick and can be made at any width the particular papermaking machine is capable of forming.

Figure 1:
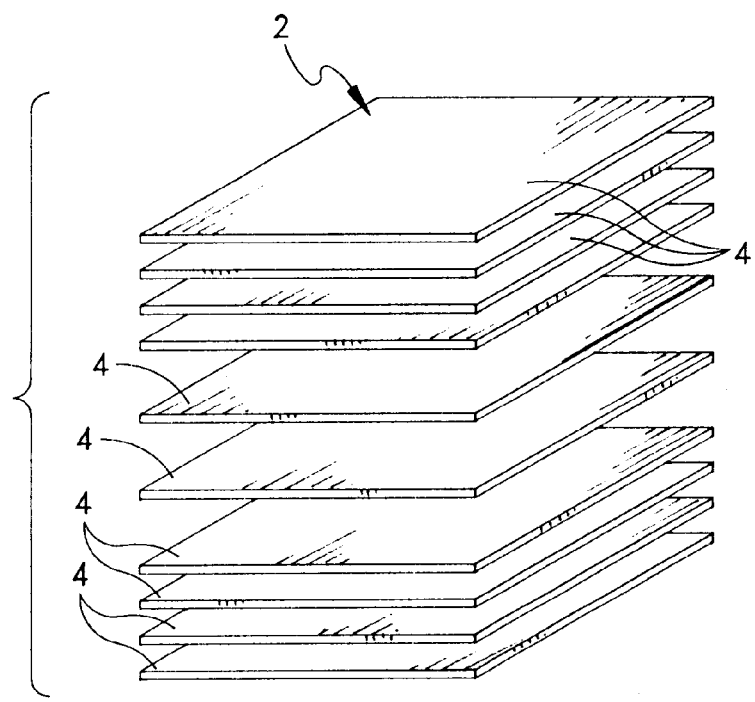
FIG. 1 is an exploded perspective view of the lay-up for a method of manufacturing a water transport plate employed in the present invention.
Figure 2:
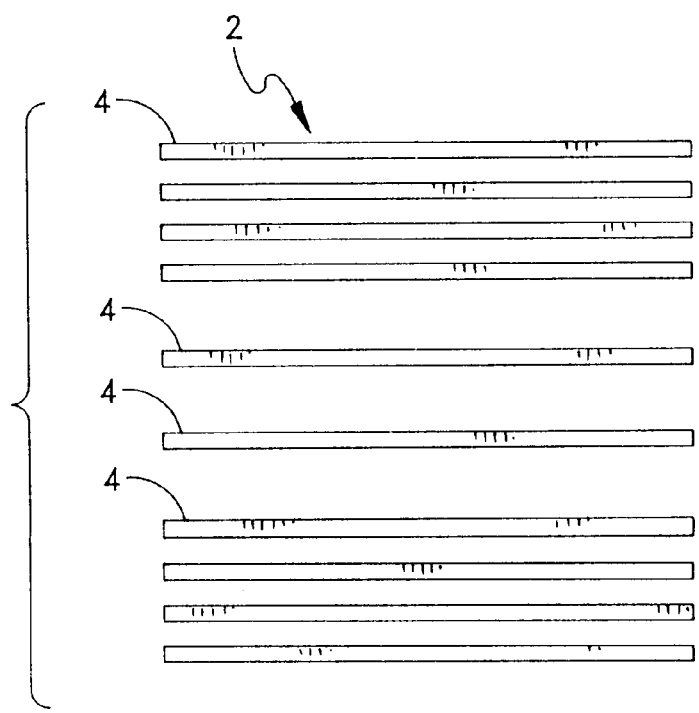
FIG. 2 is a front view of the lay-up shown in FIG. 1.

The planar sheet is dried at a temperature sufficient to dry the planar sheet without beginning to cure the thermosetting resin. Typically, the drying temperature ranges from abut 200° F. (about 93° C.) to about 300° F. (about 149° C.), with about 225° F. (about 107° C.) to about 275° F. (about 135° C.) preferred. Once the planar sheet has been dried it is cut to the desired sizes of main sheets 4 and laminated (see FIGS. 1 and 2). Generally, water transport plates, as with other fuel cell components, are about 89 cm (about 35 inches) by about 89 cm (35 inches) or about 114 cm (about 45 inches) by about 114 cm (about 45 inches). Alternatively, the water transport plate of the present invention may be 30 cm by 15 cm or 12 inches by 6 inches.

Lamination comprises laying-up the main shetts 4 on top of one-another. The lay-up may consist of virtually any number of main shetts 4. The lay-up 2 is laminated by placing it within a molding press and compressing to the desired thickness of about 1.27 mm (about 0.05 inches) to about 3.81 mm (about 0.15 inches) under an axial load of up to about 3,000 psig and a temperature of about 300° F. (about 150° C.) to about 450° F. (about 230° C.), with a temperature of about 325° F. (about 165° C.) to about 379° F. (about 190° C.) preferred for about 1 to about 15 minutes. The laminated lay-up is then carbonized by heating at about 8° F./hour to about 1,500° F. (about 815° C.) and remaining at that temperature for about 0.5 hours to about 4 hours, and subsequently graphitized at about 3,632° F. (about 2,000° C.) to about 5,432° F. (about 3,000° C.) for about 2 hours to about 4 hours. The graphitized water transport plate blank is machined to the required thickness, planform size and coolant and reactant flow configurations. The multiple plies of the water transport plate of the present invention minimizes the possibility of contiguous large pores than can defeat the bubble pressure capability of the water transport plate and the attendant gas/water separation capability in the proton exchange membrane.

Lastly, the machined water transport plate is treated with a wettability preserving compound taken from the group consisting of oxides or hydroxides of aluminum, silicon, tin, niobium ruthenium, tantalum and tungsten. This wettability treatment is described in commonly owned pending application Ser. No. 08/751,543 filed Nov. 15, 1996.

It should be noted that the planar sheets can be formed from the graphite powder, reinforcing fibers, and cellulosic fibers. In such a case, once the planar sheets have been formed and dried, they can be impregnated with the thermosetting resin.

Manufacture of a water transport plate for use in a fuel cell of the present invention will be further clarified with reference to the following illustrative example. This example is meant to illustrate the process of forming the laminated water transport plate of the present invention. It is not, however, meant to limit the scope thereof.

EXAMPLE

The following process can be utilized to form a 40 wt % AirCo 90 graphite powder, 5 wt % FORTAFIL ½ inch unsized carbon fiber, 28 wt % OXYCHEM Phenolic resin, and 27 wt % Softwood Pulp.

1. Water is mixed with the solids in a portion of 0.4 g graphite powder, 0.05 g carbon fibers, 0.28 g Oxy-Chem Phenolic Resin, and 0.27 g Softwood Pulp to form a slurry having about 1 v/o solids.
2. Once thoroughly blended, the slurry is showered onto a horizontally moving screen to form a planar sheet with a basis weight of 250 lb./ream or 12 oz/sq.—yard, plus or minus 5%.
3. The screen is passed over a vacuum to remove some of the remaining water, and thereby partially dry the planar sheet.
4. The partially dried planar sheet is then directed over rollers and oil heated drums to volatilize residual water and form the dried paper. The drums are heated to 250° F.
5. The dried paper is spooled on a cardboard tube for collection.
6. The spooled paper is cut into 10–12 inch by 6 inch sheets.
7. The sheets are then laid up.
8. The lay-up is then compression molded to 0.140 inches at 2370 psig for 5 minutes at 345° F. (about 175° C.) to laminate the lay-up.
9. The laminated lay-up is carbonized in a nitrogen environment up to 1510° F. (about 820° C.) at 8° F. per hour and subsequently graphitized at 4262° F. at 77° F./hour (2350° C. at 25° C./hour).
10. The graphitized water transport plate blank is machined to a planform of 12.26 inches by 6.00 inches and to a thickness of 0.072 inches. 0.024 inch deep coolant flow channels are machined into one face and 0.025 inch deep air flow channels are machined into the opposite face.
11. The machined water transport plate is wettability treated with tin oxide by saturating the plate by immersion in a solution of 1.7 moles per liter of tin tetrachloride pentahydrate dissolved in water, removing the plate from the tin solution and immersing in an ammonia solution maintained at a pH of about 9, removing the plate from the ammonia solution and drying at 150–200° F. (65–93° C.), and calcining in air at 400° C. (750° F.) for 1 hour.

In this example, the water transport plate possesses the following physical properties:

| | |
|---|---|
| Bubble pressure | 9.5 psig |
| Water permeability | $400 \times 10^{-17} m^2$ |
| Thru-Plane Resistivity | 0.025 ohm-cm |
| Compressive Yield Strength | 1100 psig |
| Median Pore Size | 2.3 microns |
| Open Porosity | 42% |

There are numerous advantages realized by the water transport plate of the fuel cell of the present invention. The water transport plate has improved structural integrity due to the use of longer reinforcing fibers than prior art water transport plates and has more uniform bubble pressure. Both of which allow use of thinner components which results in reduced cost and greater power per unit volume.

The methods of manufacturing discussed above are one of many ways to manufacture the water transport plate of the present invention. However, the resultant water transport plate must exhibit the inventive parameters and properties in accordance with the present invention in order to optimize fuel cell operation. As a result, other methods are contemplated which are capable of manufacturing a water transport plate which exhibit the aforesaid inventive physical properties.

In connection with the improved water transport plate discussed above, the PEM fuel cell of the present invention provides a capillary edge seal to prevent reactant gas intrusion into the water system and vice versa, and employs the same capillary forces to prevent coolant and product water from escaping by employing a water pressure which is less than the gas pressure. Turning to both FIGS. 4 and 5, a proton exchange membrane (PEM) fuel cell 10 is shown to include a cathode water transport plate 12 and anode water transport plate 16 which may be made in accordance with the method of manufacturing described above. Various other methods and constructions may be employed for a water transport plate in a PEM fuel cell of the present invention; however, the above-described method and construction is preferred. The cathode water transport plate 12 includes cathode air flow channels 14 while anode water transport plate 16 includes anode fuel flow channels 18. Cathode water transport plate 12 includes coolant flow channel 26, coolant manifold 28 as well as a silicon and fiberglass gasket 30.

Disposed between cathode water transport plate 12 and anode water transport plate 16 is a membrane electrode assembly, generally referenced as 20. Within the membrane electrode assembly 20, a cathode substrate 32 with a cathode bi-layer 50 thereon and silicon rubber impregnated substrate seal 52 is provided. Also provided is anode substrate 34 with an anode bi-layer 38 thereon and silicon rubber impregnated substrate seal 36.

Sandwiched between anode catalyst 40 and cathode catalyst 44 is a proton exchange membrane 48. Teflon gaskets 42 and 46 are provided above and below proton exchange membrane 48 and are in substantial vertical alignment with silicon rubber impregnated seals 36 and 52.

Figure 4:
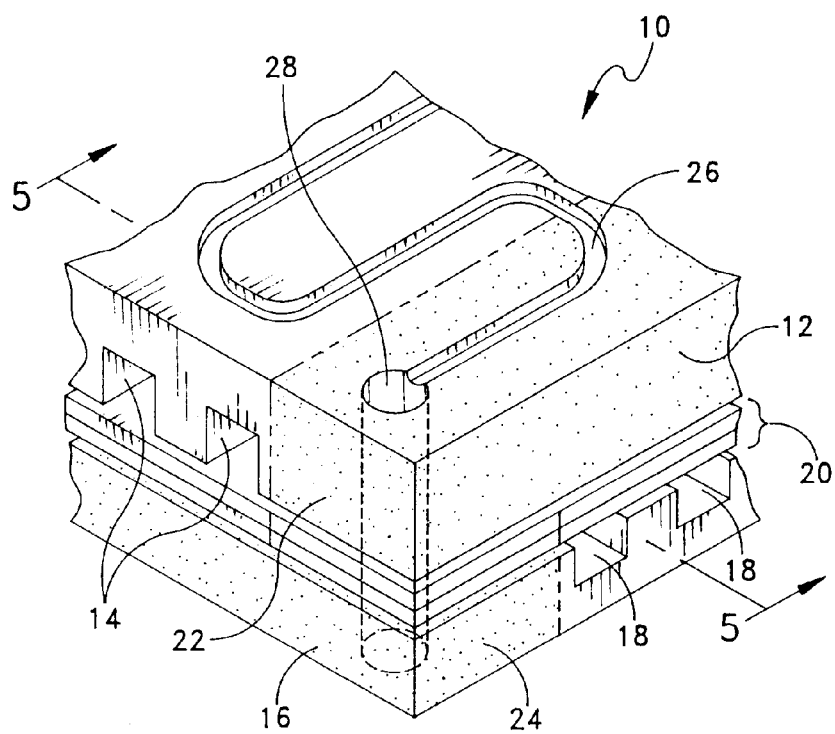
FIG. 4 is a perspective view of a PEM fuel cell in accordance with the present invention.
Figure 5:
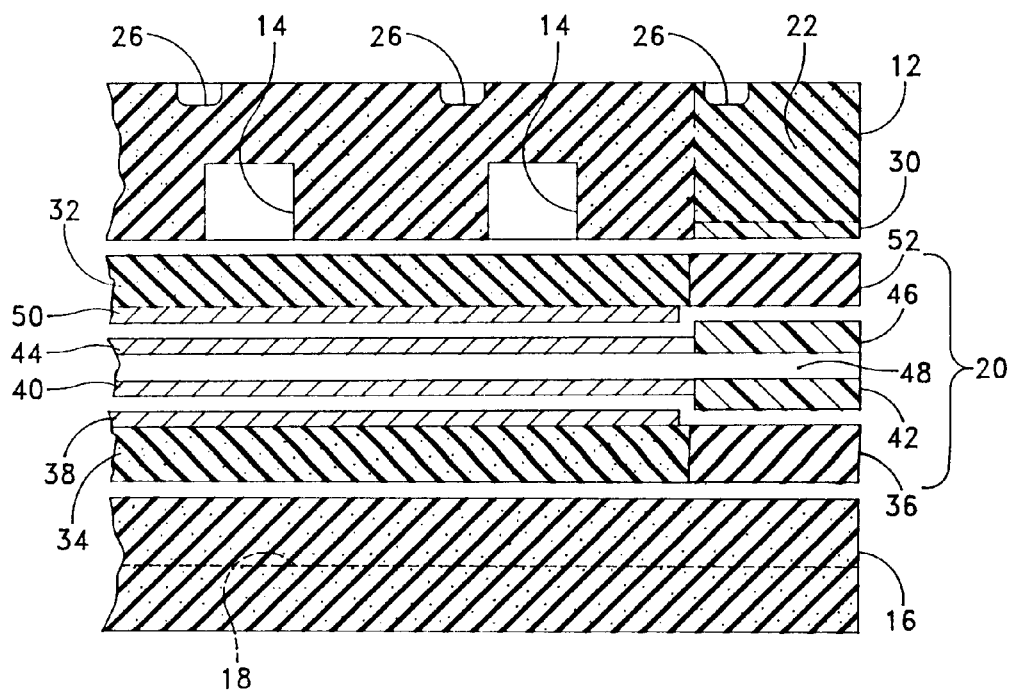
FIG. 5 is a cross-sectional view through the line 5—5 of FIG. 4.

Described herein is an edge seal for a typical PEM fuel cell that is comprised mainly of porous graphite water transport plates 12 and 16 which are filled with water as shown in FIGS. 4 and 5. The water filled water transport plates 12 and 16 rely on liquid capillary force, in regions 22 and 24 of cathode water transport plate 12 and anode water transport plate 16, respectively, to contain the reactant gases and retain product and cooling water internal to the cell by providing an external gas environment that is at a pressure near to or equal to those of the reactants and the water. The liquid capillary seal, in regions 22 and 24, functions at the cell edge in the same manner as it does internal to the cell in preventing reactant gas intrusion into the water system or over board leakage of reactants, and vice versa, in the water removal system shown in FIGS. 4 and 5.

The external environment gas pressure surrounding the stack is provided by placing the stack in a containment vessel (not shown) when the stack is operated at elevated pressure. In the preferred embodiment at pressure, the vessel gas is spent oxidant ($O_2$ depleted air exhaust) which is maintained at a pressure according to the following formula:

$$P_{OXIDANT} \geq P_{FUEL} > P_{H_2O}$$

In particular, the pressure of air through air flow channels 14 must be greater than or equal to the pressure of fuel through fuel channels 18 which must be greater than the pressure of $H_2O$ through porous water transport plates (WTP) 12 and 16 in order to achieve water containment and the water capillary edge seal in accordance with the present invention. A cell operating with reactant pressures of 14.7–16.0 PSIA would typically have a water pressure of 11.7–13.0 PSIA. In addition, the following characteristics will be achieved if the water liquid capillary edge seal is carried out in accordance with the present invention:

$$\Delta P \text{ OXIDANT to } H_2O \approx \Delta P \text{ FUEL to } H_2O \leq \text{Bubble Pressure Capability of WTP}$$

In order for the water capillary edge seal of the present invention to work properly, the change in pressure of air to water must be less than or equal to the bubble pressure capability of the water transport plate at hand. The change in pressure of hydrogen fuel to water must also be less than or equal to the bubble pressure capability of the water transport plate at hand to achieve the desired water capillary edge seal of the present invention.

The PEM fuel cell of the present invention utilizes a solid polymer membrane for ion exchange and is devoid of a liquid electrolyte. Water is the product of the electrochemical reaction within a PEM cell. In addition, water circulation is also the preferred coolant within the PEM fuel cell. It is this source of water that provides the liquid media for the water capillary edge seal for PEM fuel cells in accordance with the present invention. As a result, the present invention provides water capillary edge seal capability specifically and uniquely to PEM fuel cells which, prior to the present invention, was not available.

It would be appreciated by those skilled in the art that various changes and modifications can be made to the illustrated embodiments without departing from the spirit of the present invention. All such modifications and changes are intended to be covered by the appended claims.

What is claimed is:

1. A fuel cell assembly with liquid water being a product of the electrochemical reaction and the coolant within the fuel cell, comprising:

at least one water transport plate including a central portion and a peripheral portion integral with and circumferentially completely surrounding said central portion; said at least one water transport plate being porous; said peripheral portion of said at least one water transport plate having a bubble pressure in excess of 4 psig and a mean pore size of 3 microns or smaller;

a proton exchange membrane adjacent to said central portion of said at least one water transport plate;

said at least one water transport plate being filled with product water from the electrochemical reaction of the fuel cell and the coolant; said product water being retained within said at least one water transport plate and within said peripheral portion by capillary action; said water forming a wet edge seal with said peripheral portion of said at least one water transport plate; said wet edge seal preventing the escape of reactant gaseous beyond said peripheral portions of said at least one water transport plate.

2. The fuel cell assembly of claim 1, wherein each of said water transport plates are made of porous graphite.

3. The fuel cell assembly of claim 1, wherein said at least one water transport plate is a pair of water transport plates forming a sandwich with said proton exchange membrane disposed therebetween.

4. A fuel cell water transport plate, comprising:

a central active portion;

a peripheral sealing portion; said peripheral sealing portion having a bubble pressure in excess of 4 psig and a mean pore size of 3 microns or smaller;

said active portion being porous to the transmission of gas and fillable with water;

said peripheral and active portions being fillable with water and capable of retaining said water therein by capillary forces; and whereby retention of water within said active and peripheral sealing portion of said water transport plate provides a water capillary edge seal to prevent escape of reactant gases past said active and peripheral portion.

5. The fuel cell assembly of claim 4, wherein said water transport plate is made of porous graphite.

* * * * *